Figure 1:
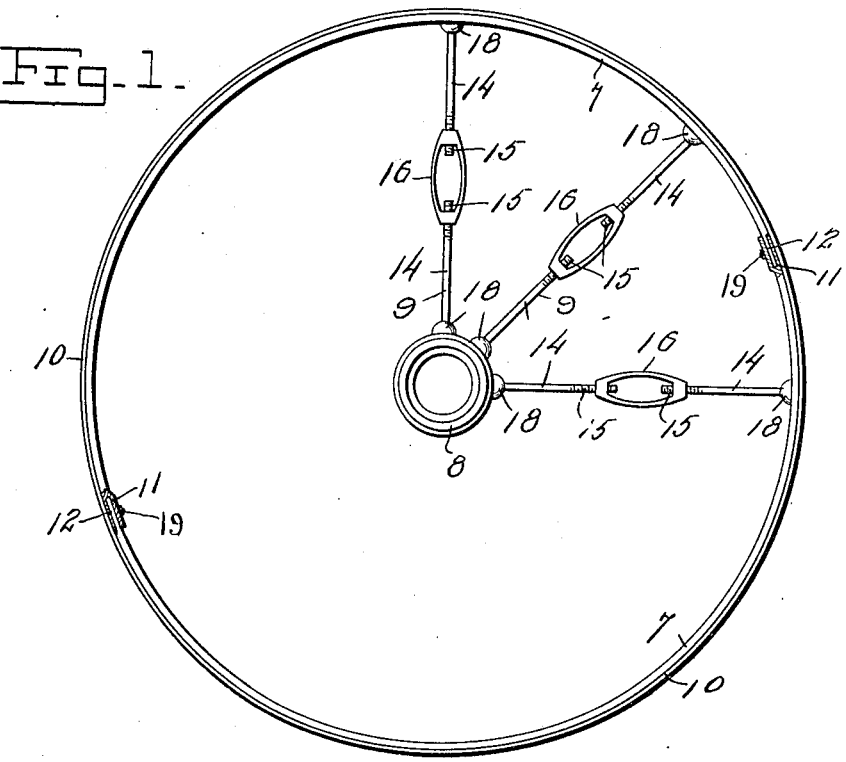

J. JENKINSON.
WHEEL.
APPLICATION FILED SEPT. 30, 1907.

910,001.

Patented Jan. 19, 1909.

2 SHEETS—SHEET 1.

Witnesses
L. L. Armstrong.
C. J. Boehmer.

Inventor
J. Jenkinson,
By Chandlee & Chandlee
Attorneys

J. JENKINSON.
WHEEL.
APPLICATION FILED SEPT. 30, 1907.

910,001.

Patented Jan. 19, 1909.

2 SHEETS—SHEET 2.

Witnesses
L. L. Armstrong.
C. S. Boehmer

Inventor
J. Jenkinson,
By Chandler & Chandler
Attorneys

THE NORRIS PETERS CO., WASHINGTON, D. C.

UNITED STATES PATENT OFFICE.

JOSIAH JENKINSON, OF OROFINO, IDAHO.

WHEEL.

No. 910,001.      Specification of Letters Patent.      Patented Jan. 19, 1909.

Application filed September 30, 1907. Serial No. 395,254.

*To all whom it may concern:*

Be it known that I, JOSIAH JENKINSON, a citizen of the United States, residing at Orofino, in the county of Nez Perce, State of Idaho, have invented certain new and useful Improvements in Wheels; and I do hereby declare the following to be a full, clear, and exact description of the invention, such as will enable others skilled in the art to which it appertains to make and use the same.

The present invention has reference to vehicle wheels and it aims to provide an exceedingly simple, durable, and inexpensive article of that class in which the rim and hub are connected together by a series of two-part spokes the members of which are capable of adjustment relatively to each other, thus maintaining the spoke taut between the hub and the rim.

The invention further resides in the formation of a metallic wheel rim in two parts each of which is provided at one end with a pocket in which the adjacent end of the other part is secured.

The invention will be readily understood from a consideration of the following detailed description, and its preferred embodiment is illustrated in the accompanying drawings, in which like parts are designated by corresponding reference numerals, throughout the several views.

Figure 2:
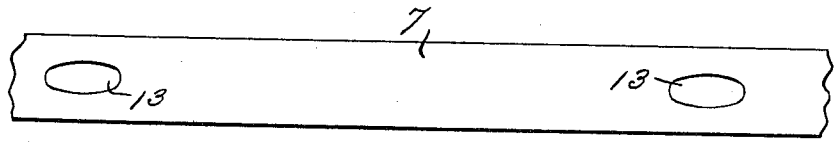
Figure 3:
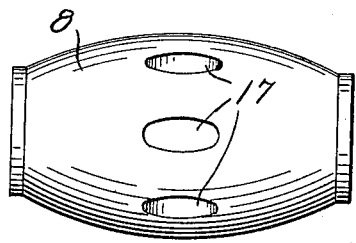
Figure 4:
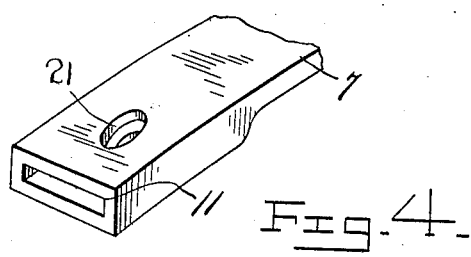
Figure 5:
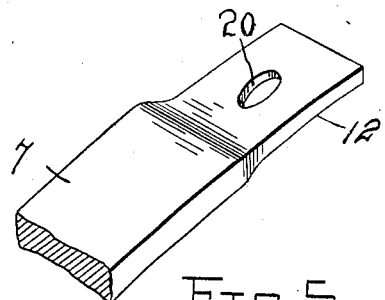
Figure 6:
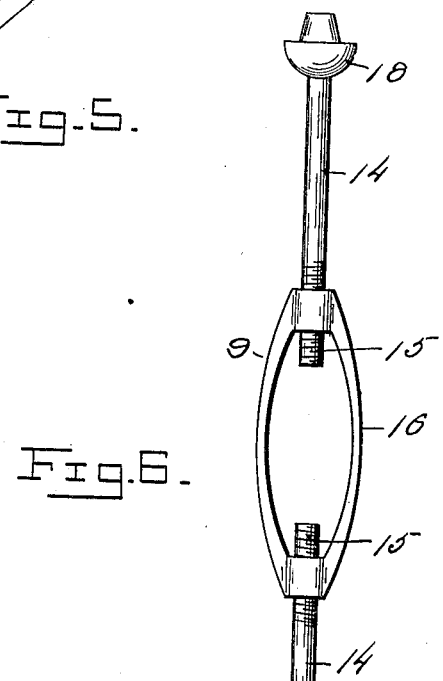

Of the said drawings, Figure 1 is a front elevation of a wheel constructed in accordance with the present invention, Figs. 2 and 3 are enlarged fragmental side elevations of the rim and hub, showing the formation of the oval sockets therein, in which the spoke ends fit; Figs. 4 and 5 are enlarged detail perspective views of the opposite ends of one of the rim sections, and Fig. 6 is an enlarged detail view of one of the spoke members.

Referring more particularly to the drawings 7 designates the rim of the wheel, 8 the hub, 9 the spokes by which the hub and rim are connected together, and 10 the tire secured to the latter.

The rim, which is formed of steel, consists of two semicircular sections, each of which is provided at one end with a pocket 11 formed by thickening such end and boring or otherwise forming a socket or seat therein. The other end of each section is trimmed so as to form a tongue 12, the tongue end of each section being adapted to fit in the adjacent pocket end of the other section.

Both rim sections are provided with a longitudinal series of oval openings or holes 13 which receive the similarly shaped ends of the spokes 9. Each spoke, as shown, consists of two similar members 14 having their threaded inner ends 15 connected by a turnbuckle 16, the outer end of each spoke member being oval-shaped, as stated above, the metal hub being likewise provided with a series of oval spoke holes 17. Near its outer end each member is provided with a collar 18 formed integral therewith, which collars are adapted to bear against the hub and rim to prevent displacement of the spokes. It will therefore be apparent that when the spoke members are connected together by the turnbuckle and their oval outer ends fitted in the openings in the hub and rim, the spokes may be maintained taut at all times by the rotation of the turnbuckles in the proper direction. It will likewise be apparent that the two-part formation of the spokes renders it possible to remove a damaged member and replace it by a new one. The meeting ends of the rim sections may be further secured together by means of bolts or rivets 19 which extend through openings 20 and 21 formed therethrough, one end of each bolt being threaded, so as to permit removal thereof and subsequent detachment of said sections from each other.

The tire 10 which is carried by the rim may be formed either of steel or rubber, in which latter instance the rim sections have their longitudinal edges slightly flanged.

What is claimed, is,

1. The combination, in a wheel, of a hub and a rim each provided with a series of spoke holes, the rim consisting of a pair of semi-circular sections provided at one end with an inwardly-extending longitudinal pocket and at the other end with a longitudinally-disposed tongue, the tongue of each section being adapted to fit in the pocket end of the other section, for connecting said sections together, and a series of spokes having their opposite ends fitted in said spoke holes, each spoke consisting of a pair of members adjustably connected together at their inner ends.

2. The combination, in a wheel, of a hub and a rim each provided with a series of spoke holes, the rim consisting of a pair of semi-circular sections provided at one end with an inwardly-extending longitudinal pocket and at the other end with a longitudinally-disposed tongue, the tongue of each section being adapted to fit in the pocket end of the other section, for connecting said sections together, and a series of spokes connecting said hub and rim, each spoke consisting of a pair of similar members having their outer ends fitting in said holes and their mutually-adjacent inner ends connected by a turn-buckle, whereby the outer members of said spokes may be forced away from the inner members of said spokes, to distend said rim, each spoke being provided near its opposite ends with enlargements adapted to bear against said hub and rim.

In testimony whereof, I affix my signature, in presence of two witnesses.

JOSIAH JENKINSON.

Witnesses:
WALLACE N. DODD,
INGVART HANSEN.